3,021,737
METHOD OF PRODUCING METAL STRIPS BI-LATERALLY TAPERED IN CROSS SECTION BY COLD ROLLING
Karl Titze, Vienna, Austria, assignor to Martin Miller Aktiengesellschaft, Vienna, Austria
Filed Oct. 21, 1958, Ser. No. 768,751
Claims priority, application Austria Jan. 10, 1958
1 Claim. (Cl. 80—60)

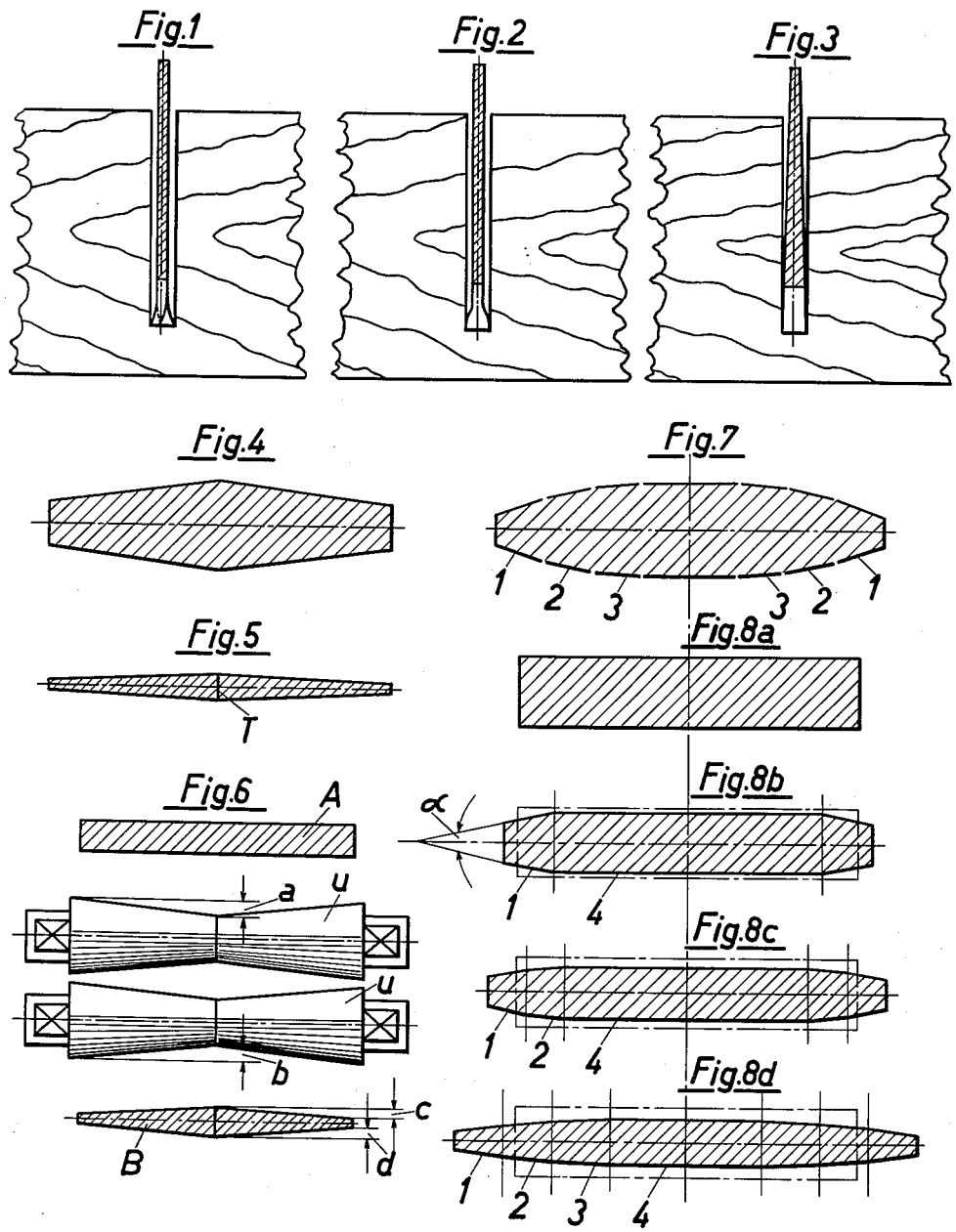

This invention relates to a method of producing by cold rolling of metal strips bilaterally-tapered in cross-section. Such metal strips are particularly suitable for making saw blades and knife blades. For this purpose, the bilaterally-tapered strips are each longitudinally divided at the centre and the resulting halves are subjected to appropriate further manufacturing steps.

In the same way as all saws used for cutting wood and other materials, saw blades made of cold-rolled strip metal must be so shaped that when sawing, a slit is formed of a width suitable for the species of wood or material, its shape, its moisture content and so forth in order that the saw blade shall not jam while working.

The most usual method is appropriate offsetting of the teeth; more rarely, swaging. The disadvantage remains, however, that the blade frequently fits too loosely in the slit or kerf, bulges sideways, is impeded in cutting, and, ultimately, runs out.

The most suitable form for saw blades is one with a tapered cross-section when, depending again on the kind of material to be cut, the teeth need no or hardly any offsetting. The tapered form of the saw blade enables it to be self-guiding in the kerf, the danger of bulging and running-out is thus restrained, the power required is less, the cutting loss is smaller, and the sawn faces are of better appearance.

Reasons for the seldom use of tapered saw blades of cold-rolled steel strip, are that the latter material is not freely available, and the relatively difficult and consequently more expensive method of manufacture involved.

In particular, it has hitherto been necessary to use as the starting material for the manufacture of cold-rolled tapered blades, the correspondingly more difficulty produced (consequently more expensive and less readily procurable) singly or doubly tapered hot strip, the cross-sectional form whereof has to be accurately predetermined in view of the percentage elongation according to the dimensions of the finished cold-rolled strip, in order that in the cold-rolling the stretching or elongation of the material shall be uniform over the entire cross-section; because an uneven stretch will inevitably produce folds in the material which cannot be eliminated from the finished product.

An object of the invention is to enable replacement of the expensive, hot-rolled tapered strip steel made to a special section, by the cheaper hot-rolled strip of preferably rectangular cross-section. This results in an appreciable advantage in the procurement and cost of the starting material for the cold-rolling.

The invention provides a method of producing metal strips bilaterally tapered in cross-section by cold rolling, in which a starting strip substantially rectangular in cross-section is subjected to the rolling forces at any given time only in two zones which are symmetrically disposed with reference to the longitudinal axis of the strip and which zones have a width which is only a part of half the width of the strip whereas this strip is allowed to deform freely and without obstruction in those parts of its cross-section which lie outside the zones subjected at any time to the rolling forces.

Another feature of the invention resides in subjecting the strip to the rolling forces only close to its longitudinal edges during the shaping of the strip with the aid of this method.

Another feature of the invention resides in that in this method the zones in which the rolling forces act on the strip are progressively displaced from the edges of the strip toward the longitudinal axis of the strip during successive passes and the angle included on both sides by the two opposed contact surfaces between the two rolls and the strip is reduced in successive rolling passes.

It is a further object of the invention to subject substantially the entire width of the strip to the zonewise rolling, in which the zones in which the rolling forces act on the strip are progressively displaced from the edge of the strip toward the longitudinal axis of the strip in successive passes and the angle included on both sides by two opposed contact surfaces between the two rolls and the strip is reduced in successive passes.

The invention relates also to apparatus for carrying out the method.

In accordance therewith the invention provides apparatus for producing of metal strips bilaterally tapered in cross-section by cold rolling, which comprises at least one pair of rollers, each of which pairs comprises at least one roll ground to a bilateral taper, and in which the difference between the most widely and most closely spaced points of the gap defined by the two rolls of any pair is always greater than the desired difference between the largest and smallest thickness of the strip.

It is also a feature of the invention that in such apparatus the pair of rolls which is used in a subsequent rolling pass has a smaller difference between the widest and the narrowest points of the gap defined by the rolls than the pair of rolls used during the preceding rolling pass.

The application of these steps and the use of the apparatus according to the invention causes the strip to be acted upon in each pass over only a part of its width, the remaining parts of the strip cross-section being free to change shape without producing any swaging or upsetting action in the roll nip, because the rolls are out of contact with those parts of the strip, with however small a clearance.

In fact it has been found that corrugation or waviness of the strip, tearing at the edges and so forth are reliably avoided provided that the starting material is of a sufficient thickness. This result was unforeseeable.

In performing the method according to the invention the strip is successively subjected to the roll pressure in sections starting from the edge and proceeding towards the centreline. Those parts of the strip accompanying the section at the time of passing through the rolls and thereby exposed to tensile elongation, are themselves subjected in the next pass or passes to roll pressure and are elongated under a compressive stress, so that the preceding latent stress condition is entirely relieved.

The finished strips obtained by this cold-rolling process are capable of being parted longitudinally and the resulting unilaterally tapered strips require little or no subsequent straightening or dressing.

The foregoing and other features of the invention will be better understood from the following description aided by the accompanying drawing in which:

FIGS. 1 to 3 show different cross-sections of saw blades;

FIG. 4 represents a cross-section of a bilaterally-tapered hot-rolled strip such as hitherto used as a starting material;

FIG. 5 is a cross-section of the end product obtained by the method used hitherto, viz. a cold-rolled, bilaterally-tapered strip;

FIG. 6 shows the new starting material together with the rolls, and the end product;

FIG. 7 represents the cross-section of a strip produced by the method of the invention; and FIGS. 8a to 8d show on a different scale from FIG. 7 the separate stages of the method, beginning with the starting material as shown in FIG. 8a (with the degree of taper exaggerated) and lastly the end product at 8d.

A saw blade of usual form shown in FIG. 1, is made of rectangular strip steel and has its teeth offset in order to be able to clear the kerf in wood or other material. A saw blade with swaged teeth is shown in FIG. 2. A saw blade of more refined design, shown in FIG. 3, has the thickness of the blade decreasing continuously from the teeth to the back of the blade.

Such last mentioned saw blades have hitherto been made from strip with a considerable degree of taper, as represented in cross-section in FIG. 4. The heavier taper of the starting material must be adjusted in respect of the percentage elongation and the strength or resistance of the material, in order to obtain a sufficiently straight strip. In FIG. 5, which is somewhat exaggerated, the end product is shown to have a considerably lesser taper than the hot-rolled, starting material seen in FIG. 4. The separation line along which the strip is divided lengthways is denoted by the reference T. The term "taper" is defined as the difference between the largest and smallest thicknesses of the strip.

For the method according to the present invention the starting material is a simple strip material of rectangular cross-section as indicated by A in FIG. 6. The rolls with which the strip is further shaped, are ground to a concave, double taper. The combined taper of the two rolls is equal to the difference between the largest and smallest thicknesses of the gap defined by the two rolls or, in other words, equal to the sum of the two dimensions indicated by $a$ and $b$, i.e., the differences between the maximum and minimum radii of one role (see FIG. 6).

The combined taper $a+b$ of the rolls is, however, substantially greater than the combined taper of the rolled strip B, which equals the sum of the two dimensions $c+d$, i.e. the difference between the thickness of the strip at the edges and in the middle.

It is clear that neither the dimensions $a$ and $b$, nor the dimensions $c$ and $d$, must always be reciprocally equal. On the contrary, the rolls themselves can have different degrees of taper, or one of the rolls may be cylindrical, in which case the total taper must be provided in the other roll. The method similarly enables strip to be rolled with an asymmetrical, transverse section, or the one side of the strip may be finished plane, i.e., flat.

The total deformation of the starting strip A until the required final shape has been obtained, cannot be effected with a single pair of rolls alone. Several pairs of such rolls are required; each of these pairs of rolls must, however, satisfy the condition that its combined taper is greater than the total taper of the strip going into the particular stage or roll pass for which this pair of rolls is intended.

Thus, the starting material is a strip of rectangular cross-section. This strip is entered between a pair of tapered rolls. The rolls act on the strip only in the region of its edges but, because the strip is stretched by the action of the rolls, the central part of its cross-section likewise becomes deformed, that is to say the strip become longer and thinner. The result of the first pass is shown in FIG. 8. The edges of the strip have thus been tapered in thickness while in the centre the strip has only become somewhat thinner, with a stretching or elongation of the strip as a whole. The angle made by the two opposite contact surfaces between the rolls and the strip is denoted by $\alpha$ (see FIG. 8b). The rolls into which the strip enters for the second stage or roll pass have a slightly smaller combined taper than the combined taper of the first pair of rolls, so that the contact between the second stage rolls and the edges of the strip takes place somewhat nearer to the centreline thereof than in the case of the first pair of rolls. Deformation of the strip consequently takes place, as shown in the cross-section reproduced in FIG. 8c. The strip now already has a cross-section with a flatter taper at the edges than towards the middle. The rolls for the next pass again have a slightly smaller total taper than the preceding pair. In FIG. 8d (and with the taper exaggerated also in FIG. 7) cross-sections are shown of a strip rolled in three passes (with corresponding intermediate annealing).

The region nearest the edge of the strip is denoted by 1. This has the steepest taper, i.e., the opposed flanks enclose a larger angle. The next following regions, the taper whereof progressively decreases, are denoted by 2 and 3. The region 4, lying on either side of the centreline of the strip is, in the example shown, made with plane-parallel sides i.e., this region has had no direct contact with any rolls. The material in this region of the strip has, however, experienced stretching or elongation, and the thickness of the strip in this part has been correspondingly reduced—as is indicated in FIGS. 8b to 8c by showing the original cross-section of the strip thereon in dot-dash lines.

Therefore the two edges of this strip obtained in these intermediate stages are not bounded each by two planes, but by a series of consecutive planes. In cross-section this forms for each wide side of the strip a convex profile giving the wide sides or flanks of the strip a somewhat cylindrically convex shape. Only in this way is it possible, in spite of the fact that up to the last pass the taper of the rolls is always somewhat steeper than the taper of the strip, for the strip to be more highly compressed on the centreline than at the edges, and for this pressure to be extended to the said centreline during the last roll passes of the cold-rolling process.

This decisive circumstance enables the greater elongation of the edge zones of the strip during the first passes of the cold-rolling process to be compensated by a corresponding elongation along the centreline of the strip, and thus to relieve the internal stresses which would cause curling or twisting of the strip when subsequently parted into two unilaterally-tapered.

The following is an example of the application of the method according to the present invention.

The starting material is a hot-rolled, saw-steel strip of rectangular cross-section of 3.5 mm. thickness and 70 mm. width. The cold rolls for the first pass have a taper (dimensions $a$ and $b$, respectively, in FIG. 6) of 1.2 mm. each, i.e. together 2.4 mm. This high degree of taper, however, produces in the rolled strip only a taper of 0.8 to 0.9 mm. if (with the interposition of suitable intermediate anneals) the strip is given several passes through these same rolls and thus reduced to an edge thickness of 1.3 to 1.4 mm.; on the centreline, owing to the elongation, the strip is then 2.1 to 2.3 mm. thick.

In the next cold-rolling stage the roll taper is somewhat smaller; in the last stage the roll taper is $2\times0.2$ to $2\times0.3$ mm., i.e. a total of 0.4 to 0.6 mm. The total taper of the strip, if it can now be called that, since the edges are not bounded by plane faces but by a number of consecutive tapers, is 0.2 to 0.3 mm. The "total taper of the strip" is the difference between the thickness of the strip at the centreline and at the edges respectively.

The tapered shape, and the work-hardening of the material due to cold rolling, make the strip material manufactured according to the present invention particularly suitable for the fabrication of knife blades and saw blades of all kinds such as handsaws, panel saws, single-handed saws, and so on. As the method of the invention permits of the manufacture of strips of practically any length, the material can likewise be used for gang saws and band saws. The same method can be used for cylinder saws, such as used for cutting button blanks and barrel-making. Band knives with straight or corrugated cutting edges can likewise be made from such tapered strip.

What is claimed is:

A method of producing a metal strip which is bilaterally tapered in cross-section from a blank strip substantially rectangular in cross-section and of greater width than thickness, comprising cold rolling said rectangular blank longitudinally to reduce the cross-section thereof at a decreasing rate from the edges thereof towards the longitudinal center line of the blank to create a bilaterally tapered cross-section of increasing thickness toward the center line thereof, starting said reduction from the edges of the blank along narrow strips, only allowing metal to flow freely toward the center of the blank and widening the rolling area from said edges toward the center line of the blank in successive rolling operations until the bilateral cross-section is obtained.

References Cited in the file of this patent

UNITED STATES PATENTS

| | | | |
|---|---|---|---|
| Re. 16,884 | Tytus | | Feb. 21, 1928 |
| 181,650 | Disson | | Aug. 29, 1876 |
| 389,504 | Evans | | Sept. 11, 1888 |
| 442,550 | Searle | | Dec. 9, 1890 |
| 450,836 | Evans | | Apr. 21, 1891 |
| 1,629,724 | Moon | | May 24, 1927 |
| 1,688,252 | Tytus | | Oct. 16, 1928 |
| 2,364,610 | Archer | | Dec. 12, 1944 |
| 2,371,671 | Blount et al. | | Mar. 20, 1945 |
| 2,787,046 | Wagstaff | | Apr. 2, 1957 |

FOREIGN PATENTS

| | | |
|---|---|---|
| 692,467 | Germany | June 20, 1940 |